US006764009B2

(12) United States Patent
Melick et al.

(10) Patent No.: US 6,764,009 B2
(45) Date of Patent: Jul. 20, 2004

(54) METHOD FOR TAGGED BAR CODE DATA INTERCHANGE

(75) Inventors: Bruce D. Melick, Cedar Rapids, IA (US); David M. Snyder, Cedar Rapids, IA (US); Leslie D. Baych, Cedar Rapids, IA (US)

(73) Assignee: Lightwaves Systems, Inc., Cedar Rapids, IA (US)

( * ) Notice: Subject to any disclaimer, the term of this patent is extended or adjusted under 35 U.S.C. 154(b) by 0 days.

(21) Appl. No.: 10/158,718

(22) Filed: May 30, 2002

(65) Prior Publication Data

US 2003/0009350 A1 Jan. 9, 2003

Related U.S. Application Data

(60) Provisional application No. 60/294,375, filed on May 30, 2001.

(51) Int. Cl.[7] .................................................. G06K 7/10
(52) U.S. Cl. .................. 235/462.01; 235/375; 235/383; 235/494; 705/23; 705/26
(58) Field of Search ........................... 235/462.01, 375, 235/383, 487, 494, 462.1; 707/10; 705/23, 26

(56) References Cited

U.S. PATENT DOCUMENTS

| 4,481,412 | A | * | 11/1984 | Fields | ................... | 235/462.49 |
|---|---|---|---|---|---|---|
| 5,379,345 | A | | 1/1995 | Greenberg | | |
| 5,420,943 | A | | 5/1995 | Mak | | |
| 5,579,537 | A | | 11/1996 | Takahisa | | |
| 5,682,030 | A | | 10/1997 | Kubon | | |

(List continued on next page.)

FOREIGN PATENT DOCUMENTS

JP         406089362 A      3/1994

OTHER PUBLICATIONS

"PSC Momentum Scanner and Handspring Visor. " http://www.pscnet.com/momenvsr.htm , no date.

"Temporal rate Conversion" by Dave Marsh, http://www-.microsoft.com/hwdev/TVBROADCAST/tempRate1.htm, no date.

"Choosing a Bar Code," http://www.elfring.com/barcoe.htm, no date.

Product Profile; Hand Held Bar Code Scanner, ScanPlus 1800, by Inermec Technologies Corporation, no date.

Motorola, Symbol Technologies, Connect Things and Air-clic Form New Company to Drive the growth of E–Commerce Through One–Scan Access to the Internet by Symbol, no date.

Welch Allyn Scanteam 3400 Series, User's Guide, 1998, no date ( month, date).

*Primary Examiner*—Michael G. Lee
*Assistant Examiner*—Steven S. Paik
(74) *Attorney, Agent, or Firm*—McKee, Voorhees & Sease, P.L.C.

(57) ABSTRACT

A method of tagged bar code data interchange includes creating electronic and/or printed documents with tagged bar coded information, capturing and decoding the tagged bar coded information, caching the tagged bar coded information, parsing the bar coded data tags, stripping the data tags, and inputting/storing the bar coded information. Business can be conducted on-line using e-mail transmissions of video displayed tagged bar coded information. Such tagged bar coded information can be stored and/or input into style sheets that are in common or company-specific formats. Further, companies can receive consumer information in a format that is easily accessible by any portion, affiliate, subsidiary, or related entity of the company, no matter what software system is running.

12 Claims, 9 Drawing Sheets

U.S. PATENT DOCUMENTS

| | | | |
|---|---|---|---|
| 5,684,288 A | * 11/1997 | Renvall | 235/462.15 |
| 5,781,914 A | * 7/1998 | Stork et al. | 715/506 |
| 5,805,152 A | 9/1998 | Furusawa | |
| 5,848,202 A | * 12/1998 | D'Eri et al. | 382/306 |
| 5,872,589 A | 2/1999 | Morales | |
| 5,939,699 A | 8/1999 | Perttunen et al. | |
| 6,015,088 A | 1/2000 | Parker et al. | |
| 6,024,289 A | 2/2000 | Ackley | |
| 6,036,094 A | 3/2000 | Goldman et al. | |
| 6,039,252 A | 3/2000 | Maltsev | |
| 6,041,374 A | 3/2000 | Postman et al. | |
| 6,056,195 A | * 5/2000 | Spain | 235/432 |
| 6,108,656 A | * 8/2000 | Durst et al. | 707/10 |
| 6,149,059 A | 11/2000 | Ackley | |
| 6,189,009 B1 | * 2/2001 | Stratigos et al. | 707/10 |
| 6,389,182 B1 | 5/2002 | Ihara et al. | |
| 6,568,596 B1 | * 5/2003 | Shaw | 235/462.01 |
| 2002/0023027 A1 | 2/2002 | Simonds | |

* cited by examiner

STYLE SHEET ID    45678
F01 = AGE
F02 = LAST NAME
F03 = FIRST NAME
F04 =
F05 =
F06 =
F07 =
F08 =
F09 =
F10 =
F11 =
F12 =

FIGURE 5

STYLE SHEET ID  ANSI 6360180181DL 28 4DL

F01 = DAB = LAST NAME
F02 = DAC = FIRST NAME
F03 = DAD = MIDDLE NAME
F04 = DAN = CITY
F05 = DAO = STATE
F06 = DAP = ZIP

```
ANSI 6360180101DL 28  4DL
DABSMITH
DACJOHN
DADDARRELL
DANCEDAR RAPIDS
DAOIA
DAP52411
```

| SENDER'S DATA TAGS→ | DAB | DAC | DAD | DAN | DAN | DAP |
|---|---|---|---|---|---|---|
| RECEIVER'S DATA TAGS→ | F01 | F02 | F03 | F04 | F05 | F06 |
| FIELD NAMES→ | LAST NAME | FIRST NAME | MIDDLE NAME | CITY | STATE | ZIP |
| BAR CODED DATA CACHE→ | | | | | | |
| DECODED DATA CACHE→ | SMITH | JOHN | DARRELL | CEDAR RAPIDS | IA | 52411 |

| SENDER'S DATA TAGS→ | | | | | | |
|---|---|---|---|---|---|---|
| RECEIVER'S DATA TAGS→ | F07 | F08 | F09 | F10 | F11 | F12 |
| FIELD NAMES→ | | | | | | |
| BAR CODED DATA CACHE→ | | | | | | |
| DECODED DATA CACHE→ | | | | | | |

SENDER'S STYLE SHEET ID. = ANSI 6360180101DL 2B 4DL
RECEIVER'S STYLE SHEET ID. =

METHOD FOR TAGGED BAR CODE DATA INTERCHANGE

CROSS-REFERENCE TO RELATED APPLICATIONS

This application claims priority to U.S. Provisional Application, Serial No. 60/294,375 filed May 30, 2001 which is entitled METHOD FOR TAGGED BAR CODE DATA INTERCHANGE and is herein incorporated by reference.

BACKGROUND OF THE INVENTION

1. Field of the Invention

The present invention relates generally to bar code technology, and more particularly, though not exclusively, to a method and apparatus for creating electronic and/or printed documents with tagged bar coded information, capturing and decoding the tagged bar coded information from a variety of video displays and/or printed media, caching the tagged bar coded information, parsing the bar coded data tags, stripping the data tags, and inputting the bar coded information into a variety of applications.

2. Problems in the Art

The explosion of electronic commerce has driven companies to seek new methods and means by which to reach businesses and consumers. While the .COM frenzy has faded, companies continue to view the Internet as an under utilized resource for business. Not only does this raise issues concerning disparate systems, but current methodologies for Internet and Intranet trade require getting connected, costly administrators, and sophisticated fulfillment and processing techniques.

Currently, electronic data interchange (EDI) has a relatively low adoption level, and is limited mainly to large companies. Standards for EDI are still under discussion and are expected to evolve slowly. As a result, users must have applications that can extract data from internal systems, format this data into EDI transaction sets, and partners must be capable of accepting these formats. Accomplishing this generally requires negotiation to determine the level of interaction between the parties exchanging information, security, and issues like timing of communications.

Custom EDI applications use sophisticated computer software such as IBM DB2, Oracle, Microsoft SQL Server, or other programs, commonly referred to as middleware, in computer to computer data interchange applications. This middleware is expensive and requires a trained computer programmer to establish and maintain the data transfer links. Furthermore, middleware is not flexible. As business trading partners and suppliers change, and/or the format of data storage is modified in a host computer, the service of a trained computer programmer is required to maintain the data interchange capabilities. It is therefore desirable to minimize the amount of middleware software required.

Major retailers such as Sears, Wal-Mart, and Dayton Hudson have all but excluded small suppliers due to their EDI requirements. Small companies not possessing the infrastructure and/or volume to justify EDI investments have been excluded by major companies. This has raised an interesting dilemma for business: whether to allow system constraints to drive business practices or to allow business practices to drive systems.

In addition, many different forms of Extensible Markup Language (XML) are currently used by many firms as a means to format transaction sets. When XML is used to transmit tagged electronic data, systems on both ends of the transaction must support the import and export of XML documents. XML is not a transport mechanism, but rather a formatting tool. Most users would agree that XML is neither easy nor cheap to implement. To use XML efficiently, most software processes will require re-engineering, not simply adding XML to the existing process. In addition, more bandwidth is required to interact with XML-enabled documents.

Many large businesses have positioned themselves to conduct business online, but due to the costs and complexity associated with electronic commerce, their vendors have not been quick to follow. However, given the cost savings benefits of on-line businesses, these companies will be more willing to find new suppliers and trading partners online rather than by traditional means.

During the past decade, acquisitions and mergers have also escalated at a rapid pace as more and more companies posture for a piece of international trade. As economies continue to open, companies will continue to aggressively pursue strategic alliances to capitalize on these opportunities. To date, an overriding consideration in such alliances has been complex conversion and information exchange issues. While the Internet has done much to free the information flow, the compatibility of legacy hardware and software remains paramount.

Video Bar Codes (VBC) were developed as a new method to capture, store, and exchange bar coded information from video displays. Video Bar Codes are described in further detail in U.S. patent application Ser. No. 09/753,863, entitled METHOD AND APPARATUS FOR BAR CODE DATA INTERCHANGE, to Melick, et al, incorporated herein by reference.

Even though VBCs offer a new business method that utilize the historical benefits of bar codes to address shortcomings associated with digital data, a specific method has not been described for use as a means for "EDI/XML type" transactions.

There is therefore an unfilled need for a method and apparatus which solves these and other problems.

FEATURES OF THE INVENTION

A general feature of the present invention is the provision of a method and apparatus for tagged bar code data interchange which overcomes the problems found in the prior art.

A further feature of the present invention is the provision of a method of bar code data interchange which minimizes the need for custom and/or sophisticated middleware.

Another feature of the present invention is the provision a method of bar code data interchange which allows for data to be exchanged between computers using different operating systems.

A further feature of the present invention is the provision of a method of bar code data interchange in which data may be exchanged between different computer software applications.

Another feature of the present invention is a method of bar code data interchange which uses tagged bar codes within a video displayed document.

Another feature of the present invention is a method of bar code data interchange which uses tagged bar codes within a printed document.

Another feature of the present invention is the provision of a method and apparatus for bar code data interchange which allows business-consumer transactions via video displayed bar codes.

Another feature of the present invention is the provision of a method and apparatus for bar code data interchange which allows business-consumer transactions via printed bar codes.

Another feature of the present invention is the provision of a method and apparatus for bar code data interchange which allows business-business transactions via video displayed bar codes.

Another feature of the present invention is the provision of a method and apparatus for bar code data interchange which allows business-business transactions via printed bar codes.

These, as well as other features and advantages of the present invention, will become apparent from the following specification and claims.

SUMMARY OF THE INVENTION

The present invention is directed to a method and apparatus for bar code data interchange. Generally, the present invention includes creating electronic and/or printed documents with tagged bar coded information, capturing and decoding the tagged bar coded information from a variety of video displays and/or printed media, caching the tagged bar coded information, parsing the bar coded data tags, stripping the data tags, and inputting the bar coded information into a variety of applications.

This method and apparatus for interchanging tagged and/or un-tagged bar coded data can be used in a variety of computer platforms, such as, but not limited to, a stand-alone software package, integrated in operating systems such as Windows™, Unix, Linux, etc., integrated into custom software applications such as QuickBooks Pro 2001 by Intuit, as a web-based system, or as a web-based system which is a combination of Extensible Markup Language (XML) and tagged video bar coded data.

In a preferred embodiment, a business user or consumer will use an integrated software system to create electronic generated documents which include tagged bar coded information, create specific style sheets to define bar coded data tags, publish documents with tagged bar coded information, scan video displayed or printed documents with a high scan rate LED bar code reader to capture tagged bar coded information, cache tagged bar coded information, parse the tagged bar coded information and applicable software applications, strip the bar coded data tags, input stripped bar coded data into the applicable software application.

This scanned information is not formatted specifically for any business/consumer software and therefore is easily transferable between businesses/consumers which may use different software applications to manipulate the same data to suit their needs. This minimizes the need for many of the conversion programs or interpretation programs, commonly known as middleware, and provides data interchange across a wide variety of settings for a myriad of purposes.

A more complete understanding of the method and apparatus for bar code data interchange will be afforded to those skilled in the art, as well as a realization of the additional features and advantages thereof, by a consideration of the following detailed description of the preferred embodiment. Reference will be made to the appended drawings which will first be described briefly.

DETAILED DESCRIPTION OF THE INVENTION

The present invention is generally comprised of a method and apparatus for a programmable data interchange medium for integrated software applications. This method and apparatus of the present invention for interchanging tagged and/or un-tagged bar coded data can be used in a variety of computer platforms, such as, but not limited to, a stand-alone software package, integrated in operating systems such as Windows™, Unix, Linux, etc., integrated into custom software applications such as QuickBooks Pro 2001 by Intuit, as a web-based system, or as a web-based system which is a combination of Extensible Markup Language (XML) and tagged video bar coded data. These bar codes may be either standardized or proprietary bar code formats. Common standardized 1D and 2D bar code formats include Code 39, Code 128, Interleaved 2 of 5, or PDF 417.

Figure 1:
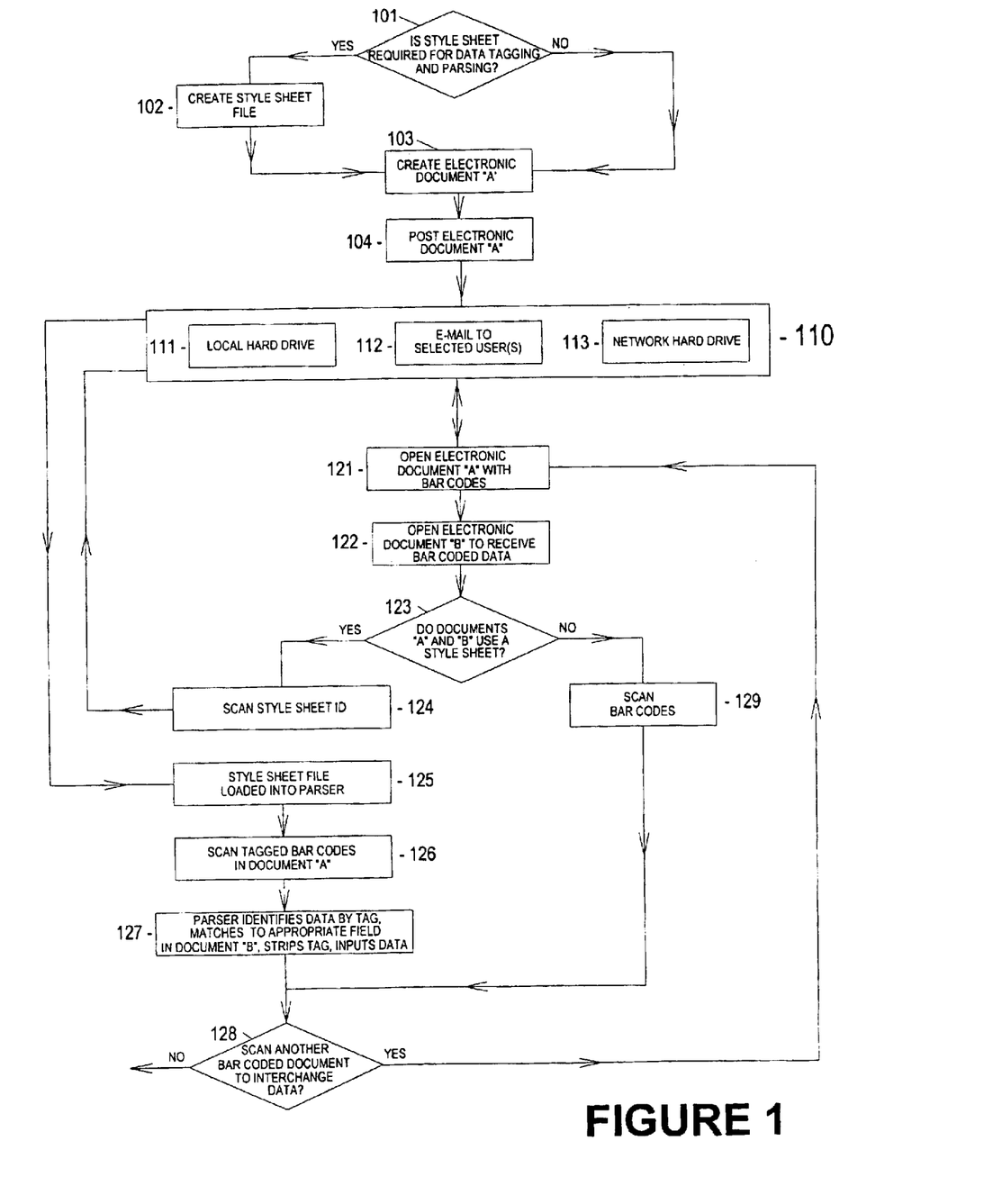
FIG. 1 is a flowchart representation of the preferred method of the present invention.

In a preferred embodiment a business user or consumer will create electronic generated documents which include one-dimensional, tagged bar coded information, create specific style sheets to define bar coded data tags, publish documents with tagged bar coded information, scan video displayed or printed documents with a high scan rate LED bar code reader to capture tagged bar coded information, cache tagged bar coded information, parse the tagged bar coded information and applicable software applications, strip the bar coded data tags, and input stripped bar coded data into the applicable software application as shown in FIG. 1.

Figure 3:
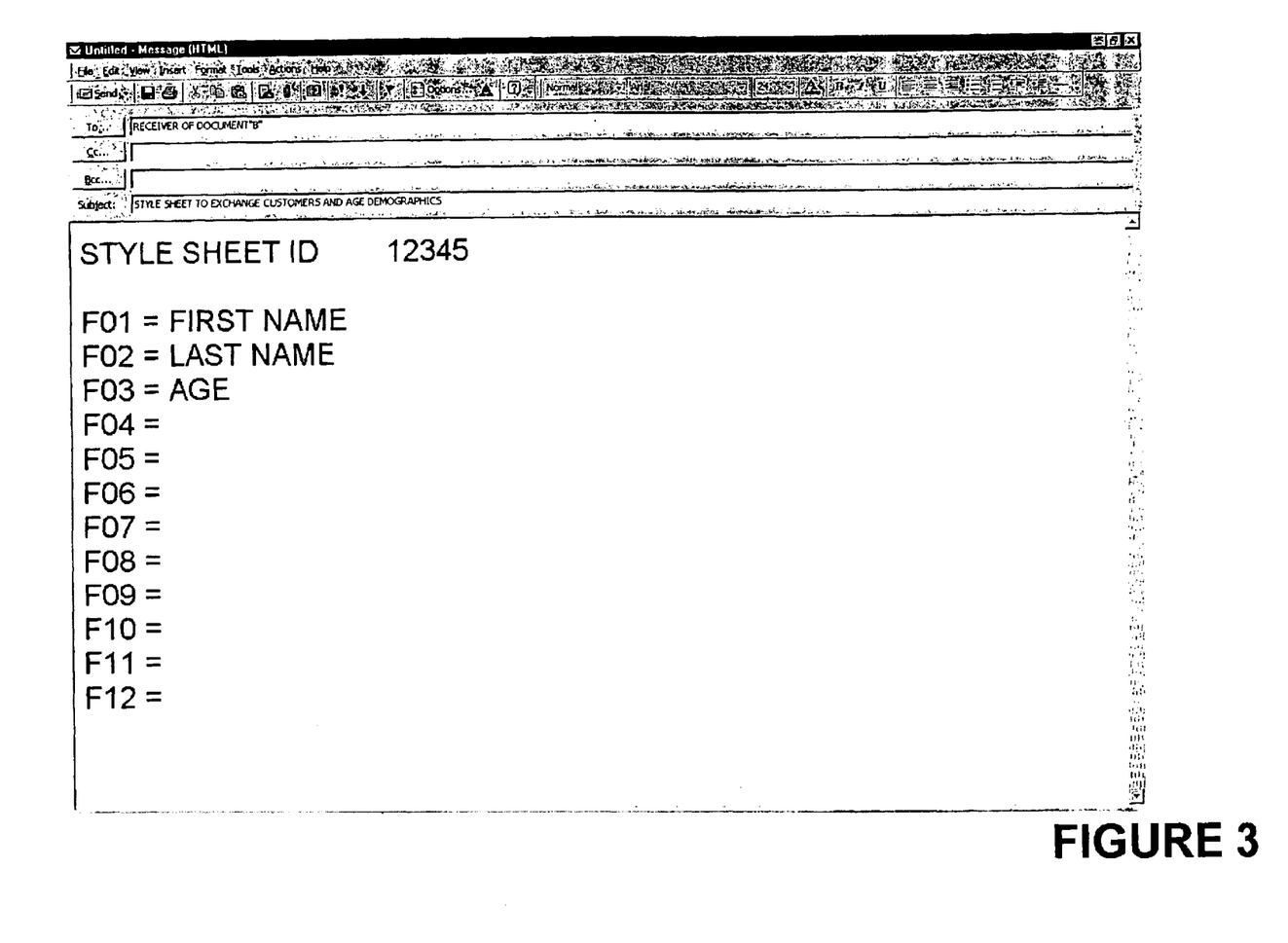
FIG. 3 is a pictorial representation of a style sheet used by the "sending company" to identify the fields and tags for the bar codes shown in FIG. 2.

Initially, a user of the present invention will make a decision 101 to tag or not tag bar codes in an electronic document. If the tagged bar codes are required, the user will create a style sheet file 102. An example of a style sheet used by a sender is shown in FIG. 3. The style sheet will be capable of automatically generating an identifier, such as the number 12345 as shown in FIG. 3, or the sender may choose to manually assign a specific identifier. The style sheet identifier is a hyperlink to the style sheet file 102, which is used by electronic document "A" 103, to decode tagged bar coded data.

Style sheet file 102, is stored in a library 110. Library 110 may use a local hard drive 111, or network hard drive 113 to store this file, Optionally, style sheet file 102 may be e-mailed to a selected user 112.

Figure 2:
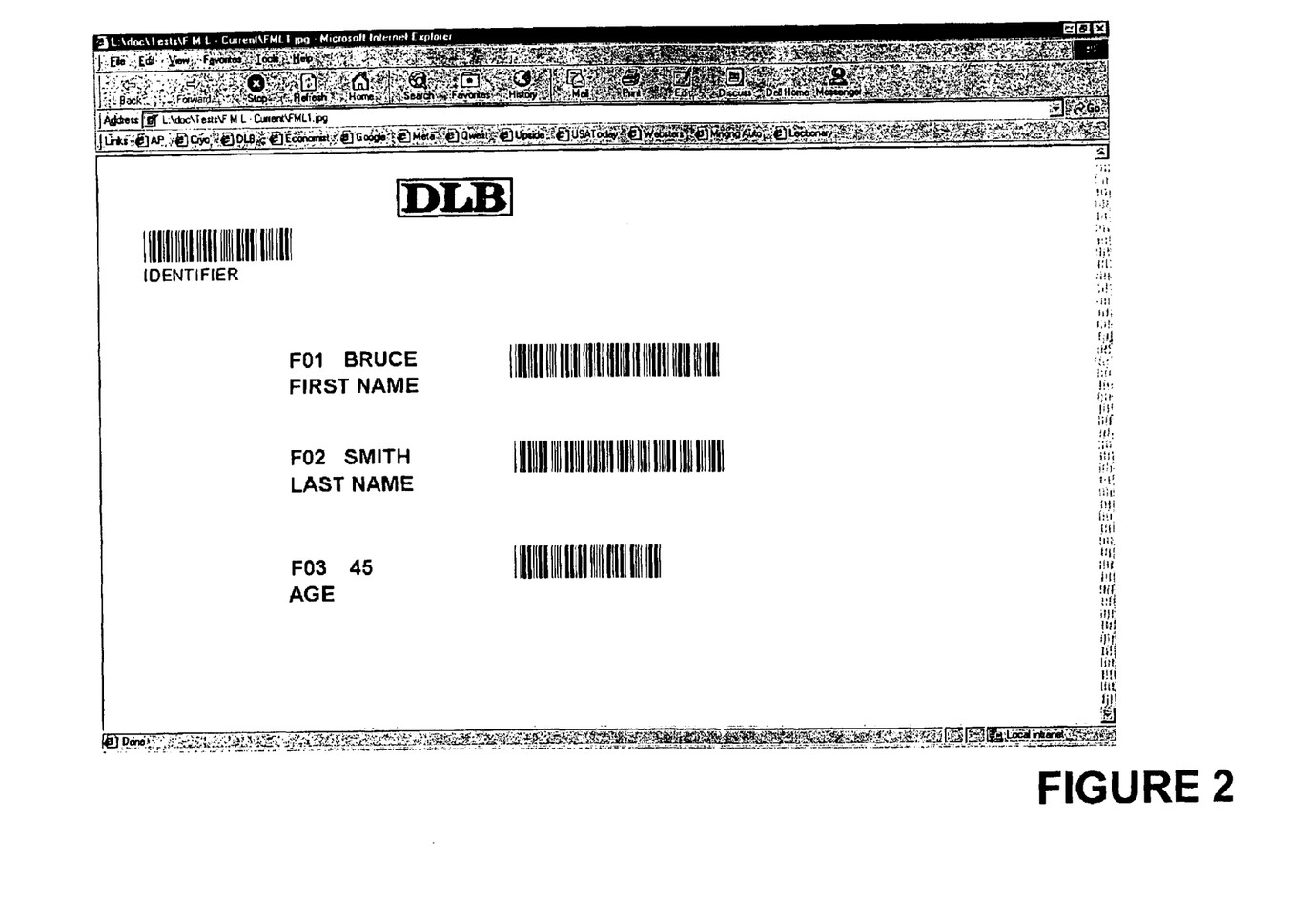
FIG. 2 is a pictorial representation of a document containing tagged bar codes.

A style sheet file 102 is used to create an electronic document "A" 103 with tagged bar codes. An example of document "A" 103 is depicted in FIG. 2 using software such as MICROSOFT EXCEL or WORD on a PC to create an electronic document. In the present invention, such software creates documents that contain electronic representations of bar coded information through the use of bar code fonts which reside on the local computer and are commonly available today from companies such as Azalea, TAL Technologies and Wasp Bar Code.

If the decision 101 does not require data tagging and parsing an electronic document "A" 103 is created with un-tagged bar codes. Electronic document "A" 103 is posted 104, to a library 110. Library 110 may use a local hard drive 111, or network hard drive 113 to store electronic document "A" 103. Optionally, electronic document "A" 103 may be e-mailed to a selected user 112.

Figure 7:
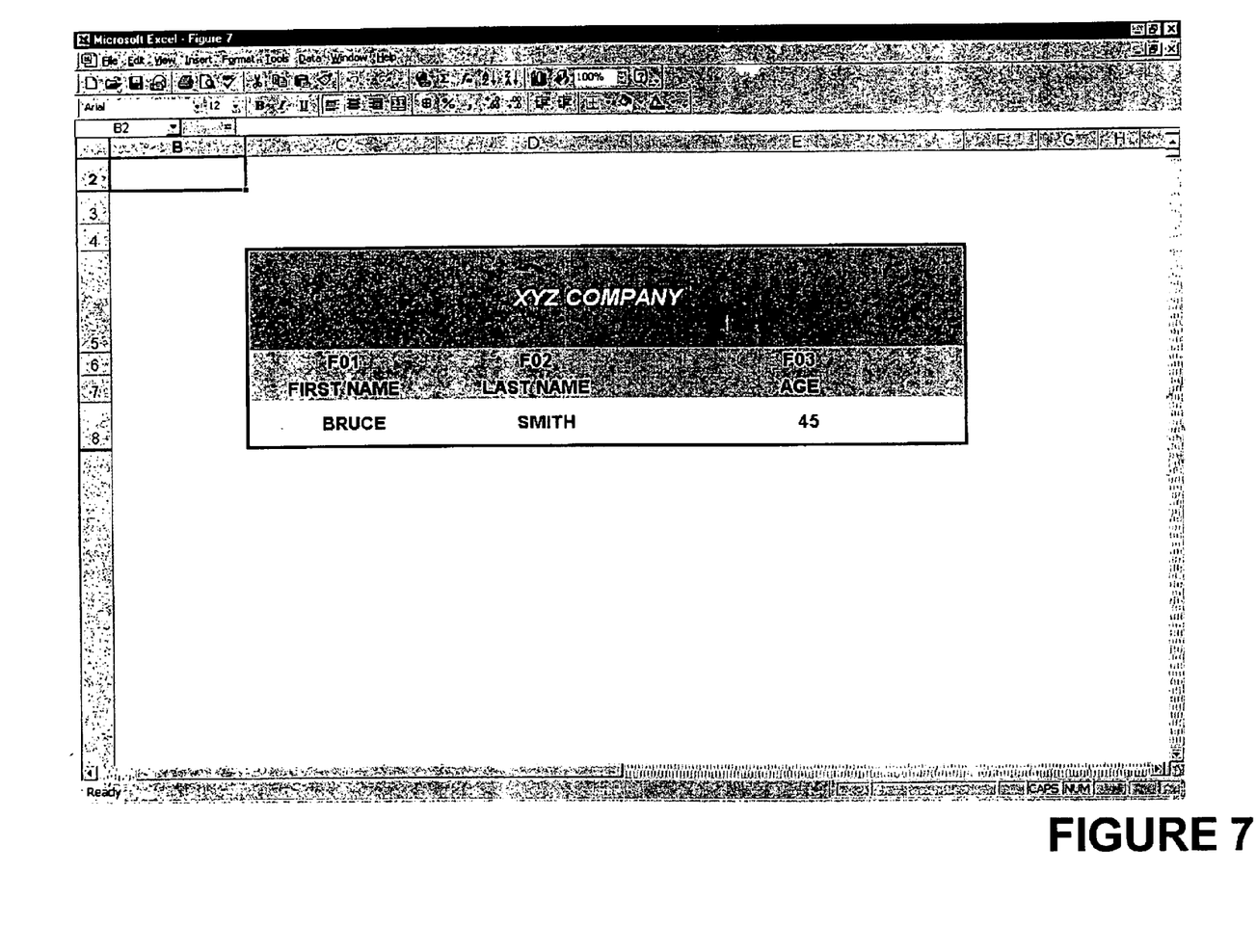
FIG. 7 is a pictorial representation of the "receiving company's" software application which receives data from the data cache depicted in FIG. 6.

A receiver 121 opens electronic document "A" 103 in a window on their computer. The receiver 121 also opens electronic document "B" (as shown in FIG. 7) 122, in a separate window on their computer in order to receive bar coded data contained in electronic document "A" 103.

A decision 123 is made to determine if electronic documents "A" 103 and "B" 122 use a style sheet file 102. Integrated software, such as Intuit's Quicken, QuickBooks, QuickBooksPro, etc. would incorporate parsing software, such as SAX commonly available from companies such as Stellent and, according to the present invention, and use style sheets in two ways. In the first method, a common style sheet is used by both sender and receiver. When a common style sheet is used, the style sheet identifier is scanned 124 in document "A" 104 in order to launch the hyperlink to open the style sheet file 102, stored in library 110.

Figure 4:
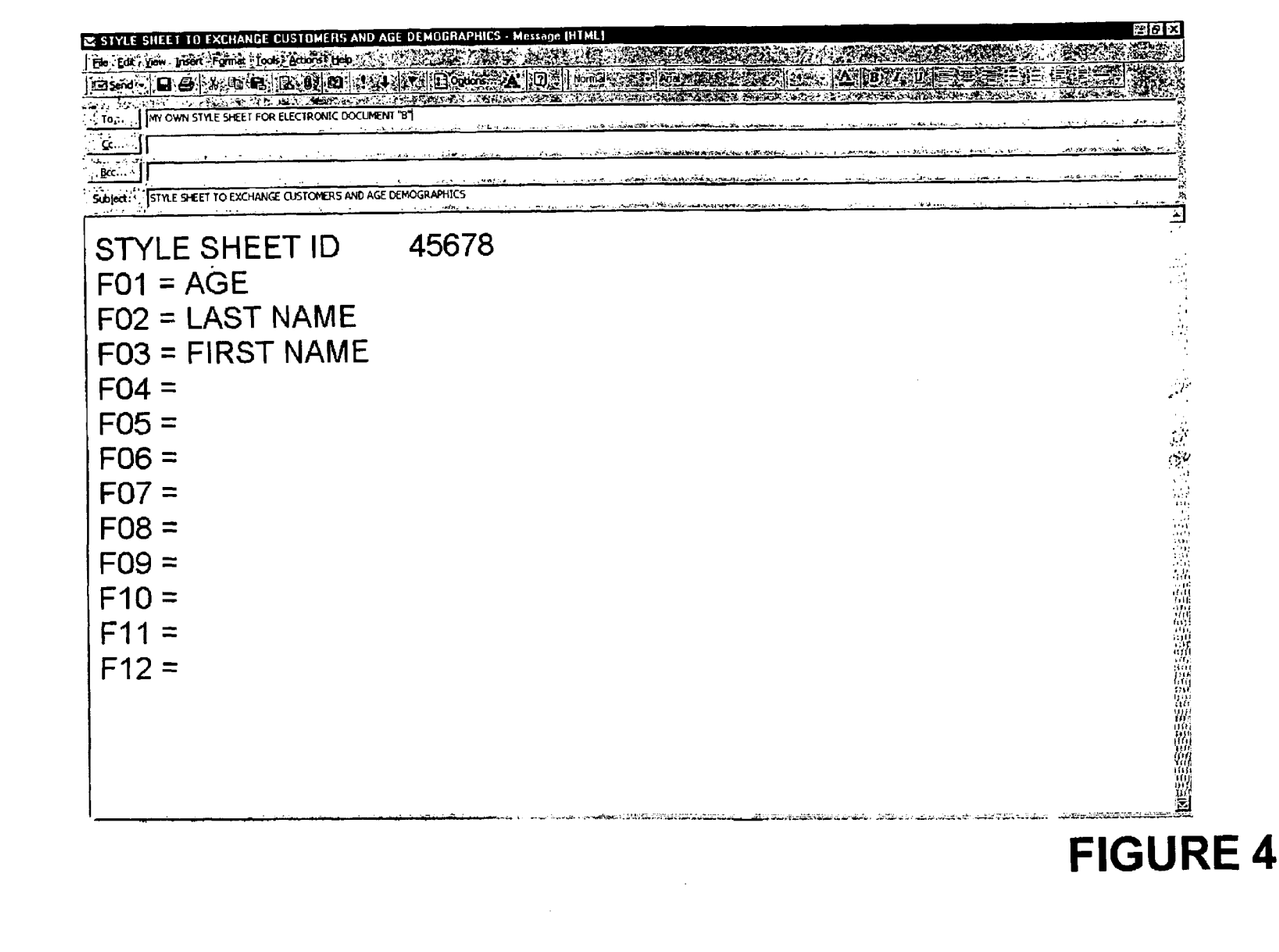
FIG. 4 is a pictorial representation of a style sheet used by the "receiving company" to identify the fields and tags to receive the bar codes shown in FIG. 2.
Figure 6:
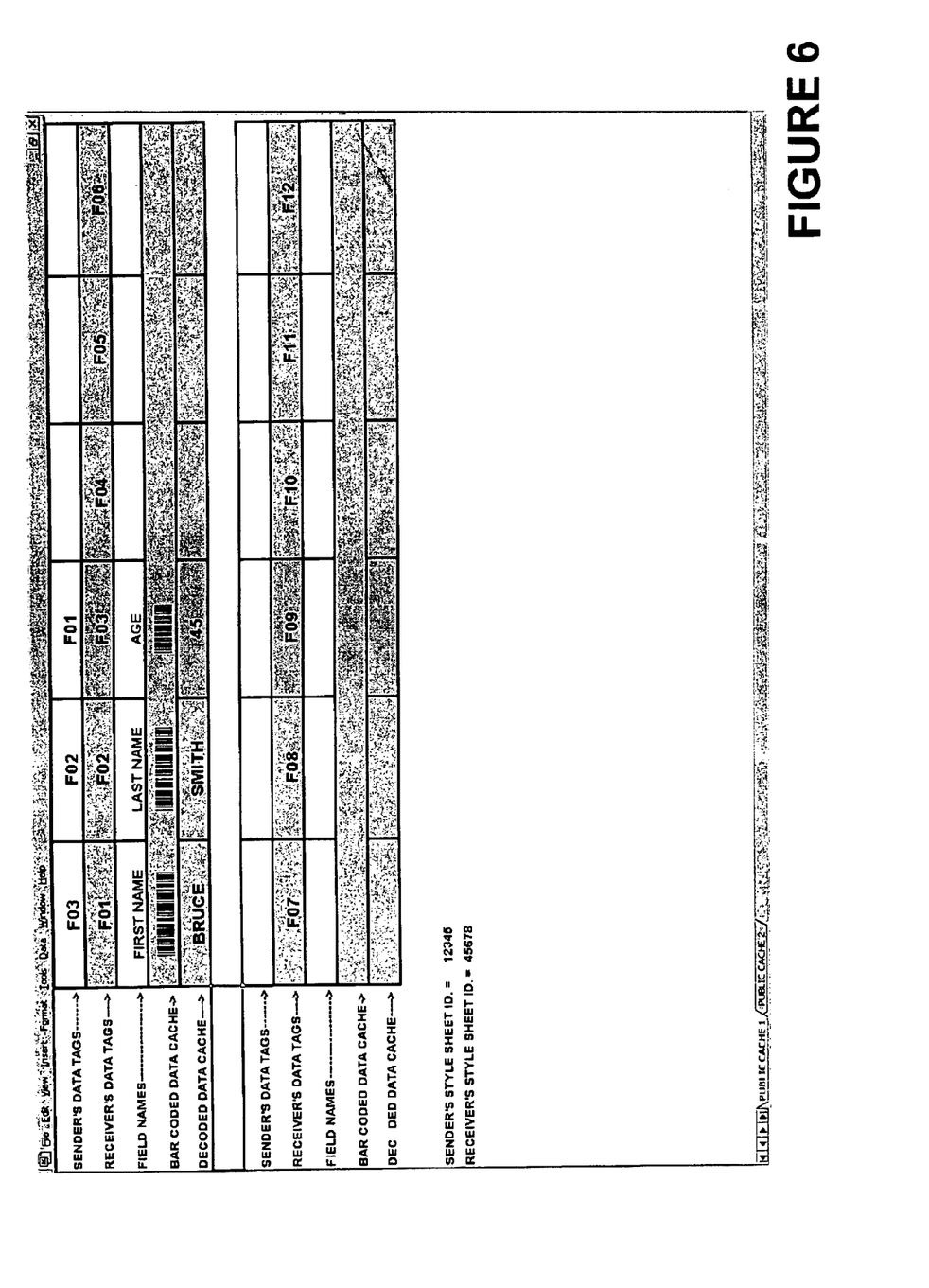
FIG. 6 is a pictorial representation of a data cache.

In the second method, two style sheets each using different "function key tags" to represent the same data fields can be used. When two different style sheets are used in step 124, the parsing and data cache application will allow the user to scan the sender's style sheet identifier and also the receiver's style sheet identifier (as shown in FIG. 4) and cross-correlate them as shown in FIG. 6.

In step 125, the style sheet file is loaded into the parsing and data cache application of the integrated software.

In step 126, the receiver scans tagged bar codes in electronic document "A" 103. The scanned tagged bar coded data is parsed and sent to a data cache, as shown in FIG. 6. In step 127, the parsing and data cache application use logic and computer routines to identify the scanned bar coded data by "function key tag", match the scanned bar coded data to the appropriate field in electronic document "B" 122, strip the "function key tag", and input the stripped bar coded data into the appropriate field in electronic document "B" 122.

In step 123, if the decision is made that electronic documents "A" 103 and "B" 122 do not require a style sheet, the receiver in step 129, scans the un-tagged bar coded information and manually chooses the appropriate field to input the data into electronic document "B" 122.

In step 128, the receiver makes a decision to scan another document bar coded electronic document, or to end the bar code data interchange.

In an alternate embodiment of the present invention, a business user or consumer will create electronic generated documents which include two-dimensional, tagged bar coded information, create specific style sheets to define bar coded data tags, publish documents with tagged bar coded information, scan video displayed or printed documents with a high scan rate LED bar code reader to capture tagged bar coded information, cache tagged bar coded information, parse the tagged bar coded information, strip the bar coded data tags, and input stripped bar coded data into the applicable software application as shown in FIG. 1.

All the steps described in the preferred embodiment of the present invention apply to the alternate embodiment of the present invention. The difference between the two embodiments is the type of data tagging used to identify data. For instance, 2-D bar codes may use the General Motors common shipping label format, GM 1724-A, or another industry specific format for tagged information.

The sender's field tags can be identfied using tags such as XML tags or "function key tags" F01, F02, F03, etc., which relate to "F1, F2, F3" respectively on a standard computer keyboard. As an example, two companies might agree to exchange data for various customers contained in their respective databases: first name, last name, and age. Using the appropriate "function key tag" in the style sheet to identify particular data elements, the two companies would agree the "function key tag" for first name data is F01, the "function key tag" for last name data is F02, and the "function key tag" for age data is F03. The style sheet would be programmable on-the-fly using the style sheet to tag data fields with the appropriate "function key tag" The style sheet would also automatically tag the data elements from the database with the appropriate "function key tag".

This embodiment of the present invention greatly reduces the number of transaction errors and greatly increases the speed of data interchange.

Data elements not identified by the same "function keys" could be used by multiple users, but this adds another step in the transaction process, and introduces the possibility of more input errors.

Figure 5:
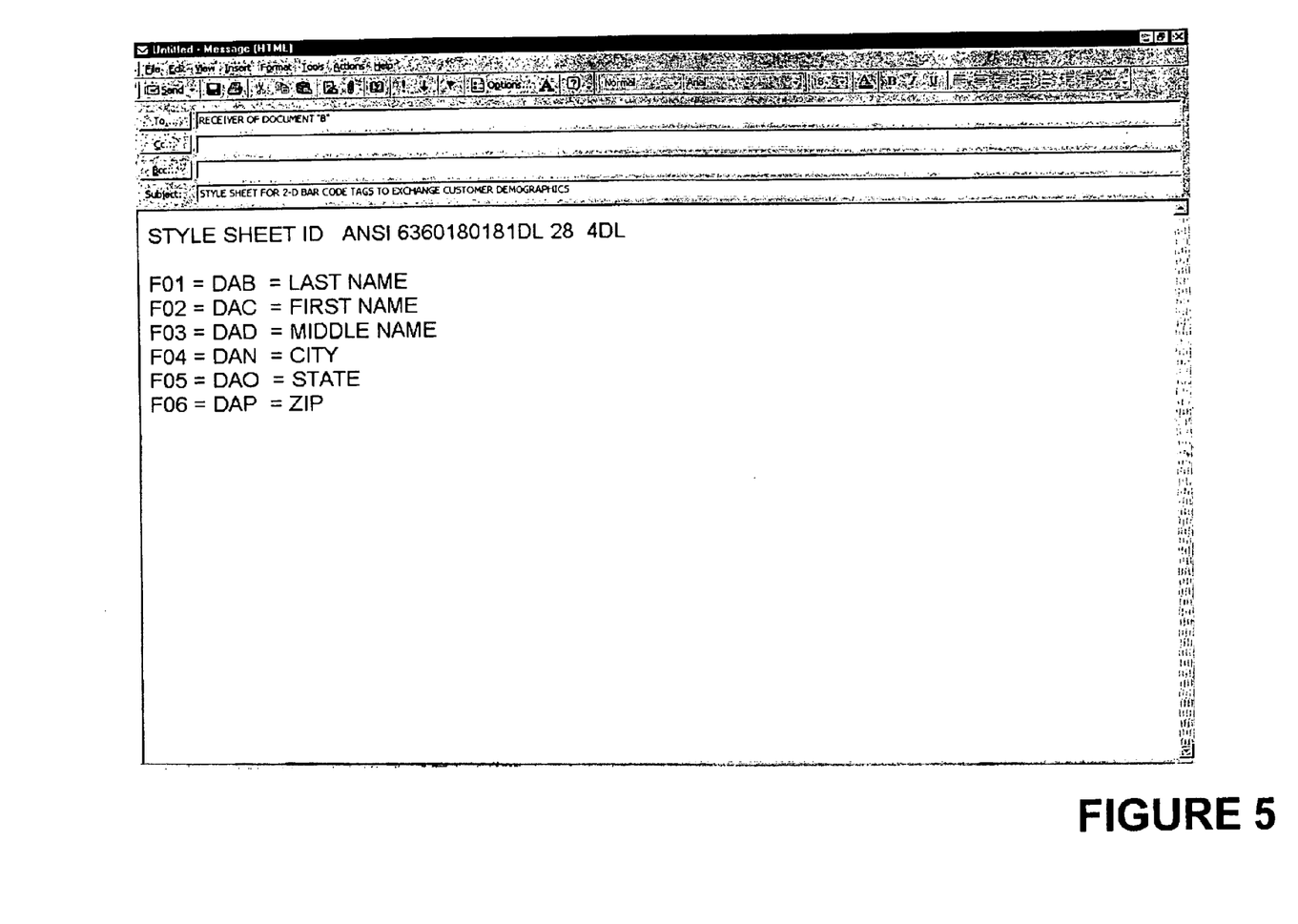
FIG. 5 is pictorial representation of a style sheet used to identify the fields and tags for the tagged two-dimensional bar coded data shown in FIG. 8.

FIG. 5 is a pictorial representation of a style sheet with data tags and field names contained in a two-dimensional bar code, such as that commonly found on a driver's license.

Figure 8:
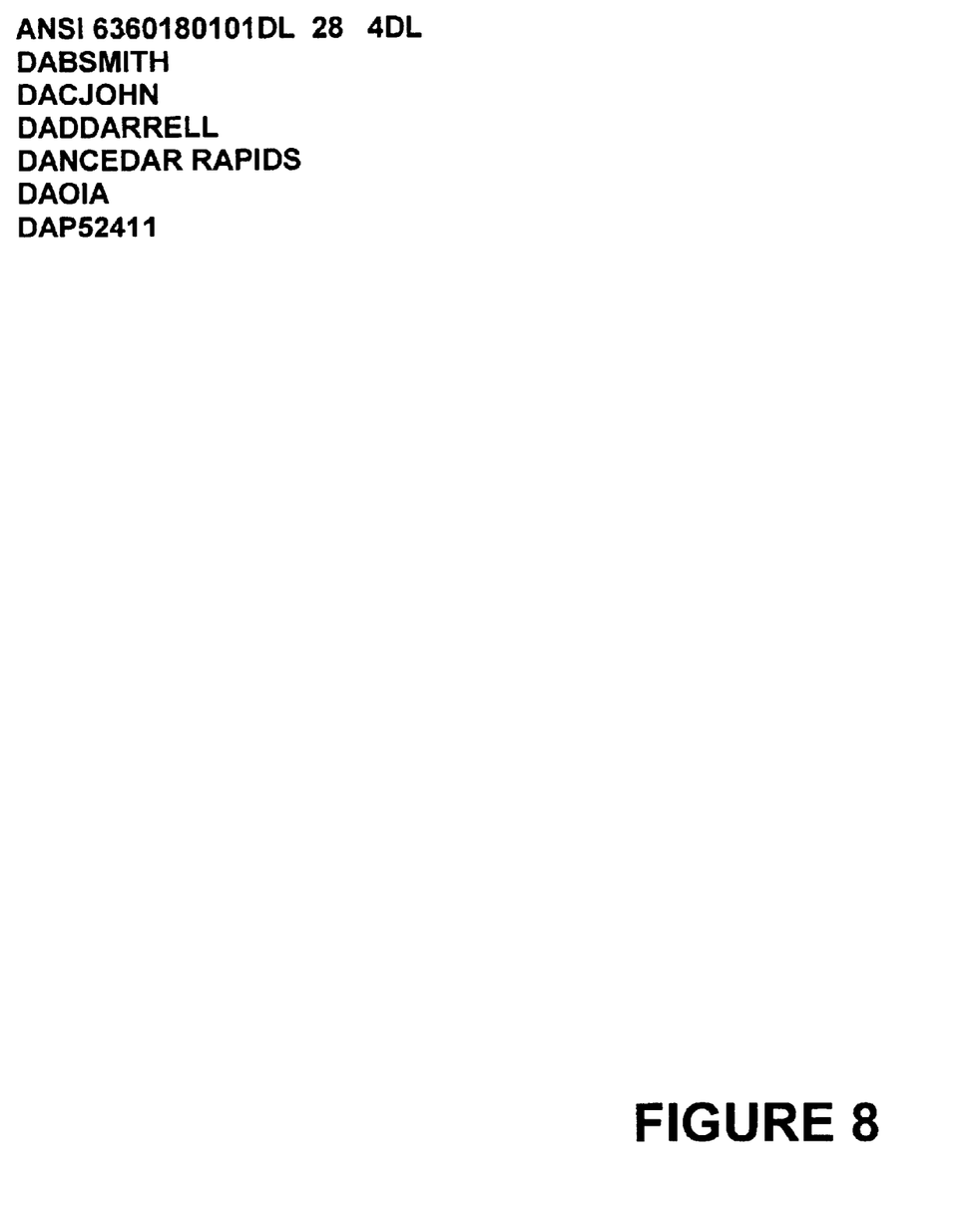
FIG. 8 is an example of data and data tags contained in a two-dimensional bar code.

FIG. 8 is an example of two-dimensional bar code data tags from a driver's license in which the last name "Smith" is tagged with the letters "DAB", the data tag for the first name "John" is the letters "DAC", etc.

Figure 9:
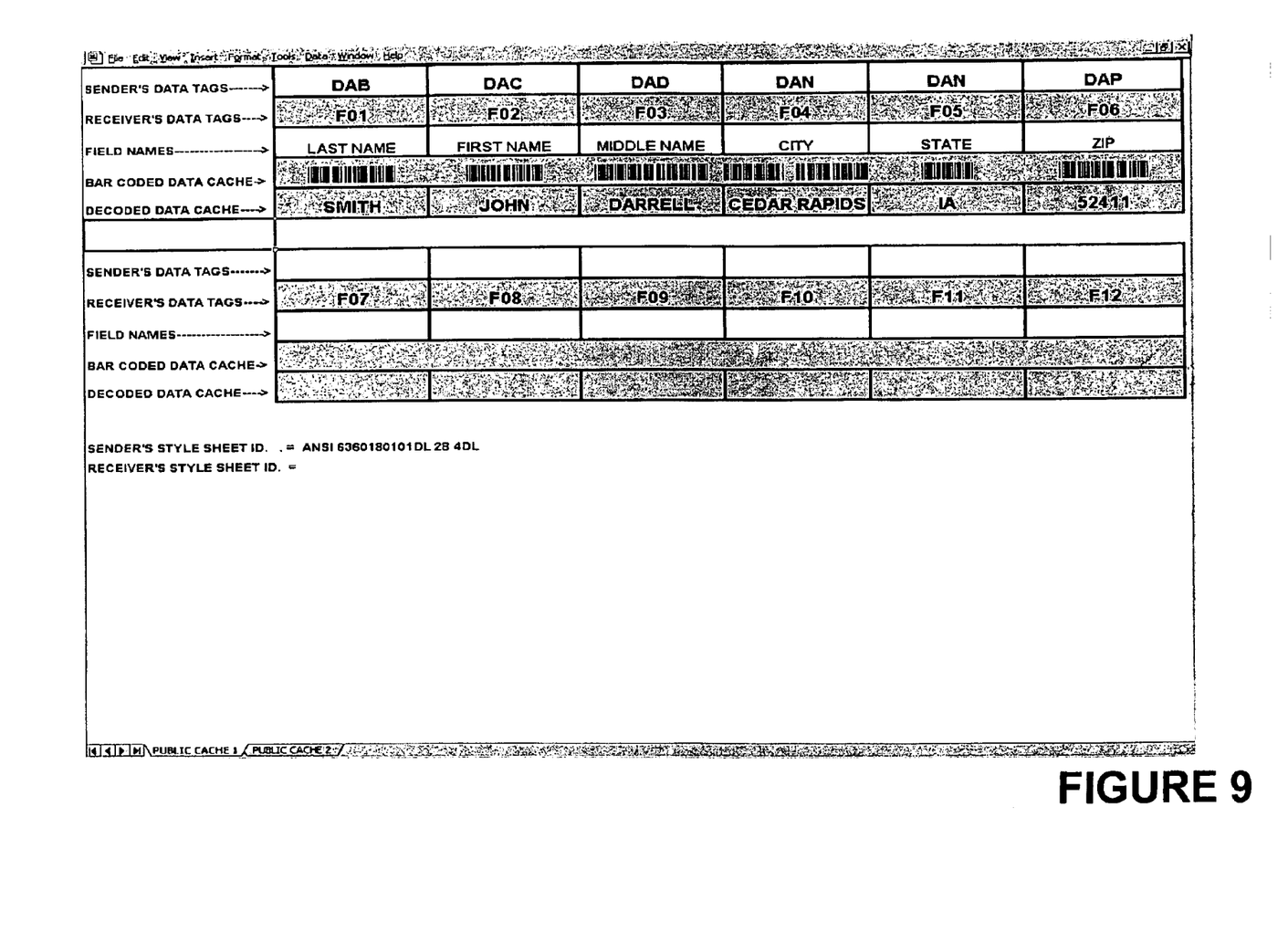
FIG. 9 is a pictorial representation of a data cache which has received the two-dimensional, tagged bar coded data represented in FIG. 8.

FIG. 9 is a pictorial representation of the parsed and cached data, as shown in FIG. 8, ready for input into electronic document "B", step 127.

A system utilizing video bar codes (VBCs) and the present invention's technology may be used to show real-time product inventory, place orders, route the order through an accounting system, make shipping arrangements, and forward the user a report. The process of executing an order online requires a sequence of events to take place. A customer may wish to replenish his/her inventory, without passing through several systems. Retailers may utilize VBCs in web sites, WebTV, television or over other mediums to index products and services in the form of an online catalog. Suppliers, who have traditionally been dependent on middleware and/or third party administrators to access and/ or execute orders will be empowered to access such requests. VBCs also allow various enabled devices to execute order placement, processing, and fulfillment simply by using this universal medium.

When used in conjunction with a bar coded financial card, as disclosed in U.S. patent application Ser. No. 60/276,203 to Melick, et al, the transaction becomes instantaneous. Currently, most companies rely on expensive administrators to process electronic transactions, due in part to the complex systems necessary to manage this process and the varying degree of sophistication between trading partners. VBCs are not constrained by these considerations, and offer universal access by simply including them in any digital transmission.

Data entry continues to challenge companies as smaller suppliers and venders continue to use paper-based systems. These companies, when equipped with video bar codes may engage in collaborative commerce while data entry and interface considerations are minimized in host company systems. HTML transmissions, when wrapped in e-mail offer easy-to-use, familiar, professional invoicing and order processing capabilities for every user.

Companies, such as UPS, offer online document exchange services with various encryption techniques requiring a higher degree of security in transmission will now have a multitude of options available to them. Last year, UPS executed over 10 billion online document exchanges at a fraction of the cost associated with paper transactions.

Applications within the medical industry are numerous, from electronic commerce between insurance carriers, HMO's, and medical practitioners to demographic data relating to patients, etc. all requiring a unique tag or identifier. Currently, medical practitioners are overwhelmed with reports, regulations, files, drug prescriptions, and other patient information that requires great care in management. Not too dissimilar from a retailer who is managing thousands of stock keeping units, the consequences of mismanagement in the medical industry is significant.

Medical practitioners frequently find it necessary to exchange critical patient data with other practitioners, pharmacies, and hospitals in a timely and accurate fashion. While not an issue within networked systems, the medical industry has not made investments in infrastructure necessary to enable electronic commerce. Currently, physicians predominately use e-Mail as their primary means of communication (55%), while only 6% use e-Mail and the internet to transport clinical information. The primary issue, according to a Harris Interactive study, has been the lack of this infrastructure investment, which has left the industry years behind other sectors. VBC technology offers to leverage off the existing infrastructure maintained in these practices, and enable them with electronic data interchange.

As an example, in this application Document "A" 103 would be an electronic patient's chart containing bar coded information. Document "A" 103 would be available on any computer display in the hospital. As a doctor makes his daily rounds, he would use an enabled device to capture applicable bar coded information displayed on the patient's electronic chart for billing and record updates, and download the tagged bar coded information to Document "B" 122 on his disparate computer information system located in his office.

Office visits that result in a prescription to be filled are currently phoned to a pharmacy or the patient is given an order form. This entire process may be streamlined electronically with VBCs containing basic demographic data from order placement to the label that appears on a prescription. In doing so, the error rate associated with fulfilling orders would be eliminated, greater controls would exist in the distribution of drugs, and reorders may be triggered without data entry.

As an example, in this application Document "A" 103 would be an electronic prescription containing bar coded information. Document "A" 103 would be e-mailed to the pharmacy with bar coded information relating to the patient information and medication required. The pharmacist would use an enabled device to capture applicable bar coded information displayed on the patient's electronic prescription for input into Document "B" 122 on their disparate computer information system.

In financial, insurance, engineering, and law firms, there are large amounts of paper and electronic documents being passed around daily. The user would benefit from the availability of these documents in a free-flowing system that could more effectively catalog and manage documents across local networks. A document management system would use VBCs as a dynamic hyper-link to access various forms of data.

As an example, in a complicated legal proceeding Document "A" 103 would be various evidence or exhibits in graphic form which are bar coded in order to launch the court overhead projection system. Document "B" 122, which are a lawyer's electronic trial notes, operate on a disparate computer system would contain video bar codes which are linked to the appropriate Document "A" 103.

Law enforcement agencies and our legal system are burdened with populating numerous standardized forms and reports, requiring unique identifiers to tag and track evidentiary materials. This industry is moving rapidly to bar coding documents, which is currently printed, tagged, and then filed. VBCs offer to streamline this process from automatic ticket generation to a free-flow of information to courtrooms, law offices, police stations, and other agencies. Currently, county and metro law enforcement agencies are unable to exchange information due to disparate systems and universal identifiers.

As an example, a city policeman would make an arrest. Document "A" 103 would be the arrest report. The suspect is then taken to a county jail which operates on a disparate computer system. Electronic document "B" 122 which is the prisoner's record, would be completed with the aid of video bar coded information contained in Document "A" 103. From here the suspect would appear in court, and information contained on Document's "A" 103 and "B" 122 would be captured and entered into yet another disparate information system.

The financial industry relies on information generated from a wide spectrum of sources to analyze, record, process, and report transactions. Some of these sources include transaction clearing houses, financial exchanges, news services, and research companies. Such systems include The Dow Jones Telequote, Bloomberg, the Associated Press, Value Line, and others electronic systems that transmit data across a video monitor. Investment and financial professionals utilize these services to retrieve, process, and manipulate this data in proprietary applications for analysis. All of these systems utilize a one-way means of data transmission, serving as a reporting service verses an interactive two-way system.

As an example, Document "A" 103 would be a financial report from a company such as Dow Jones Telequote or Bloomberg, which included VBCs. Document "B" 122 would be an order placement form running on a disparate information system. An enabled device would capture video bar coded information from Document "A" 103 and input the information into Document "B" 122.

While many larger institutions have customized their accounting and general ledger systems, a majority of their trading partners remain on disparate systems. In addition, small-to-medium size companies rely almost exclusively on outsourcing the accounting function or acquire various prepackaged systems. Intuit, the maker of Quicken and QuickBooks dominate the prepackaged accounting software market with an estimated 80% share. By utilizing VBCs with any e-mail system, basic demographic data and billing information becomes a collaborative commerce process, without the errors associated with data entry. By using VBCs vendors will be able to reduce their costs associated with traditional paper-based systems by converting to electronic forms using VBCs, develop E-commerce capabilities, and speed up the payment process. Using QuickBooks or a similar accounting system with VBCs, allow the user to get one step closer to a paperless office, reduces the time-to-process routine procedural tasks in an error free manner, and minimizes the uncertainties associated with outstanding unentered bills and invoices. VBCs offer accounting department managers a new method to streamline the entire accounting process. As an example, ABC Company would use electronic document "A" 103, which would be an electronic invoice containing bar coded information. This document could be posted electronically for payment by XYZ Company. XYZ Company would use an enabled device to capture the pertinent bar coded data from Document "A" 103 and input into their Document "B" 122 which is a check writing form on their disparate computer system.

The insurance industry relies on sophisticated hardware and software systems for claims processing, billing, and information retrieval to conduct their day-to-day business.

Processing centers, and the costs associated therewith represent a significant investment on the part of these companies and lack flexibility as it relates to capturing, processing, storing, and interchanging information. Insurance companies engage in large volumes of data entry, and spend millions of dollars every year on interfaces, populating forms, applications, etc. Applications within this industry are not unlike other applications discussed above.

The United States federal government, state governments, and various other public agencies maintain large databases of information that are frequently accessed by various departments, other government agencies, and the private sector. One example relates to the property tax assessment and collection division of county governments. Most frequently the assessment and collection divisions rely on the same information for different purposes in disparate information systems. Consequently, this requires information to be entered and re-entered by each division. VBCs would allow relevant information to be easily exchanged between divisions without the need for middleware or manual re-entry. Also, tagging such documents with bar codes provide a unique tag for management control purposes, and allow various agencies dependent on such data to share these public documents as described in other applications above.

As companies rely more and more on the Internet for marketing and e-commerce transactions, it becomes increasingly difficult to add or delete information and make changes to on-line catalogs, databases, and Internet commerce forms. The use of VBCs virtually eliminates input errors, is less time consuming, requires fewer personnel, and reduces the complexity of integrating various aspects of a company's web site.

As newer software systems replace older ones, legacy systems are increasingly a problem within organizations. Companies have a difficult time getting their mainframe to "talk" with their DOS system, and in turn have trouble getting that data to "talk" with their new Windows™ systems. Video bar coding information in legacy systems would save a lot of time and expense coding systems to convert legacy data.

VBCs offer users a multitude of options that are easy-to-use and understand, bring new functionality to existing practices, and offers the first universal means by which to communicate, through a multitude of devices.

Having thus described a preferred embodiment and other embodiments of a method and apparatus for tagged bar code data interchange, it should be apparent to those skilled in the art that certain advantages of the present invention have been achieved. It should also be appreciated that various modifications, adaptations, and alternatives may be made. It is of course not possible to describe every conceivable combination of components for purposes of describing the present invention. All such possible modifications are to be included within the spirit and scope of the present invention which is to be limited only by the following claims.

What is claimed is:

1. A method of data interchange, the method comprising:
creating a document having tagged bar coded information including data tags and data;
transmitting the document;
capturing the tagged bar coded information;
decoding the tagged bar coded information;
caching the tagged bar coded information;
parsing the tagged bar coded information;
stripping the data tags; and
inputting the data into an application.

2. The method of data interchange of claim 1 wherein the document is in electronic format.

3. The method of data interchange of claim 1 wherein the tagged bar coded information is stored as a video bar code.

4. The method of data interchange of claim 1 wherein the document is transmitted over e-mail.

5. The method of data interchange of claim 1 wherein the document is in XML format.

6. The method of data interchange of claim 1 wherein the decoding, caching, parsing, and stripping is all done as part of an integrated software system.

7. A method of doing business in which information is exchanged, the method of doing business comprising:
creating a first electronic style sheet;
entering bar coded data onto the first style sheet;
transmitting the first style select;
reading the bar coded data from the first style sheet; and
entering the bar coded data into a second electronic style sheet.

8. The method of doing business of claim 7 wherein the first style sheet and the second style sheet share a common format.

9. The method of doing business of claim 7 wherein the first style sheet and the second style sheet share common data tags.

10. The method of doing business of claim 7 wherein the first style sheet is transmitted by e-mail.

11. The method of doing business of claim 9 further comprising:
loading the second style sheet into a parsing software program;
scanning the tagged bar coded data;
parsing the tagged bar coded data; and
entering the data into an appropriate field in the second style sheet.

12. A method of receiving consumer information, the method comprising:
receiving consumer information in the form of a tagged video bar code;
decoding the tagged bar coded consumer information;
caching the tagged bar coded consumer information;
parsing the tagged bar coded consumer information;
stripping the data tags; and
storing the consumer information.

* * * * *

UNITED STATES PATENT AND TRADEMARK OFFICE
CERTIFICATE OF CORRECTION

PATENT NO. : 6,764,009 B2 Page 1 of 1
APPLICATION NO. : 10/158718
DATED : July 20, 2004
INVENTOR(S) : Melick et al.

It is certified that error appears in the above-identified patent and that said Letters Patent is hereby corrected as shown below:

Col. 10, Claim 7, line 23:
DELETE: after "style" "select"
ADD: after "style" --sheet--

Signed and Sealed this

Tenth Day of July, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,764,009 B2 |
| APPLICATION NO. | : 10/158718 |
| DATED | : July 20, 2004 |
| INVENTOR(S) | : Melick et al. |

Page 1 of 1

It is certified that error appears in the above-identified patent and that said Letters Patent is hereby corrected as shown below:

In the Specification

In column 1, line 6, please delete "claims priority to" and insert --claims the benefit of priority to--.

Signed and Sealed this
Eleventh Day of November, 2014

Michelle K. Lee
*Deputy Director of the United States Patent and Trademark Office*